United States Patent [19]

Umemoto et al.

[11] Patent Number: 4,916,316
[45] Date of Patent: Apr. 10, 1990

[54] RADIATION IMAGE RECORDING AND REPRODUCING METHOD

[75] Inventors: Chiyuki Umemoto; Masanori Teraoka; Nobuyoshi Nakajima, all of Kanagawa, Japan

[73] Assignee: Fuji Photo Film Co., Ltd., Kanagawa, Japan

[21] Appl. No.: 39,845

[22] Filed: Apr. 20, 1987

[30] Foreign Application Priority Data

Apr. 20, 1986 [JP] Japan .................................. 61-90787

[51] Int. Cl.$^4$ ................................................ G03C 5/16
[52] U.S. Cl. .................................. 250/327.2; 250/484.1
[58] Field of Search ......... 250/327.2 R, 327 A–327 L, 250/484.1

[56] References Cited

U.S. PATENT DOCUMENTS

| 4,571,493 | 2/1986 | Aorikawa | 250/327.2 |
| 4,582,988 | 4/1986 | Aagano | 250/327.2 |
| 4,636,641 | 1/1987 | Mori et al. | 250/327.2 |
| 4,743,684 | 5/1988 | Niwa et al. | 540/126 |
| 4,749,861 | 6/1988 | Watanabe et al. | 250/327.2 |

FOREIGN PATENT DOCUMENTS 0238046  10/1985  Japan .................................. 250/327.2

Primary Examiner—Janice A. Howell
Assistant Examiner—Richard Hanig
Attorney, Agent, or Firm—Sughrue, Mion, Zinn, Macpeak & Seas

[57] ABSTRACT

A radiation image recording and reproducing method comprises the steps of scanning a stimulable phosphor sheet carrying a radiation image stored thereon with stimulating rays, and detecting light emitted by the stimulable phosphor sheet upon stimulation by stimulating rays to obtain an image signal. The image signal including a stimulated light emission signal and an after-glow signal representing a stimulated light emission after-glow emanated by the portion of the stimulable phosphor sheet no longer being exposed to stimulating rays is detected in such a condition that the level of the after-glow signal at a position on the stimulable phosphor sheet 20 mm beyond the position where exposure to stimulating rays is completed is not higher than $10^{-2.5}$ times the level of the stimulated light emission signal, and the level of the after-glow signal at a position 430 mm beyond the position where exposure to stimulating rays is completed is not higher than $10^{-3.3}$ times the level of the stimulated light emission signal.

5 Claims, 2 Drawing Sheets

RADIATION IMAGE RECORDING AND REPRODUCING METHOD

BACKGROUND OF THE INVENTION

1. Field of the Invention

This invention relates to a method of recording and reproducing a radiation image by use of a stimulable phosphor sheet. This invention particularly relates to a radiation image recording and reproducing method wherein a radiation image stored on a stimulable phosphor sheet is read out without being adversely affected by a stimulated light emission after-glow.

2. Description of the Prior Art

When certain kinds of phosphors are exposed to a radiation such as X-rays, α-rays, β-rays, γ-rays, cathode rays or ultraviolet rays, they store a part of the energy of the radiation. Then, when the phosphor which has been exposed to the radiation is exposed to stimulating rays such as visible light, light is emitted by the phosphor in proportion to the stored energy of the radiation. A phosphor exhibiting such properties is referred to as a stimulable phosphor.

As disclosed in U.S. Pat. Nos. 4,258,264, 4,276,473, 4,315,318 and 4,387,428 and Japanese Unexamined Patent Publication No. 56(1981)-11395, it has been proposed to use a stimulable phosphor in a radiation image recording and reproducing system. Specifically, a sheet provided with a layer of the stimulable phosphor (hereinafter referred to as a stimulable phosphor sheet or simply as a sheet) is first exposed to a radiation passing through an object such as the human body to have a radiation image of the object stored thereon, and is then scanned with stimulating rays which cause it to emit light in proportion to the stored radiation energy. The light emitted by the stimulable phosphor sheet upon stimulation thereof is photoelectrically detected and converted to an electric image signal, which is processed as desired to reproduce a visible image having an improved image quality, particularly a high diagnostic efficiency and accuracy.

FIG. 1 is a schematic view showing an example of a radiation image read-out apparatus employed in the aforesaid radiation image recording and reproducing system.

In the radiation image read-out apparatus of FIG. 1, a laser beam 1a of a predetermined intensity is emitted as stimulating rays from a laser beam source 1 to a galvanometer mirror 2. The laser beam 1a is deflected by the galvanometer mirror 2 to form a laser beam 1b impinging upon a stimulable phosphor sheet 3 disposed below the galvanometer mirror 2 so that the sheet 3 is scanned by the laser beam 1b in the main scanning direction, i.e. in the width direction of the sheet 3 as indicated by the arrow A. While the laser beam 1b impinges upon the stimulable phosphor sheet 3, the sheet 3 is conveyed in the sub-scanning direction as indicated by the arrow B, for example, by an endless belt device 9. Therefore, scanning in the main scanning direction is repeated at an angle approximately normal to the sub-scanning direction, and the whole surface of the stimulable phosphor sheet 3 is two-dimensionally scanned by the laser beam 1b.

As the stimulable phosphor sheet 3 is scanned by the laser beam 1b, the portion of the sheet 3 exposed to the laser beam 1b emits light having an intensity proportional to the stored radiation energy. The light emitted by the stimulable phosphor sheet 3 enters a transparent light guide member 4 from its front end face 4a disposed close to the sheet 3 in parallel to the main scanning line. The light guide member 4 has a flat-shaped front end portion 4b disposed close to the stimulable phosphor sheet 3 and is shaped gradually into a cylindrical shape towards the rear end side to form an approximately cylindrical rear end portion 4c which is closely contacted with a photomultiplier 5. The light emitted by the stimulable phosphor sheet 3 upon stimulation thereof and entering the light guide member 4 from its front end face 4a is guided inside of the light guide member 4 up to the rear end portion 4c, and received by the photomultiplier 5 via a filter (not shown) for selectively transmitting the light emitted by the sheet 3. Thus the light emitted by the stimulable phosphor sheet 3 in proportion to the radiation energy stored thereon is detected and converted into an electric image signal by the photomultiplier 5. The electric image signal thus obtained is sent to an image processing circuit 6 and processed therein. The electric image signal thus processed is then reproduced into a visible image and displayed, for example, on a CRT 7, or stored on a magnetic tape 8, or directly reproduced as a hard copy on a photographic film or the like.

In this manner, the radiation image stored on the stimulable phosphor sheet 3 is read out. However, since the front end face 4a of the light guide member 4 extends approximately over the overall width of the stimulable phosphor sheet 3 in parallel to the main scanning line thereon, all light emitted by the portions of the stimulable phosphor sheet 3 covered by the front end face 4a enters the light guide member 4 from the front end face 4a and is detected by the photomultiplier 5. That is, not only the light emitted by the portion of the stimulable phosphor sheet 3 upon which the laser beam 1b impinges at any given instant, in proportion to the radiation energy stored on that portion, but also the other light emitted as described below by the portions of the sheet 3 covered by the front end face 4a enters the light guide member 4 and is detected by the photomultiplier 5. The light other than the light emitted by the portion of the stimulable phosphor sheet 3 upon which the laser beam 1 impinges at any given instant in proportion to the radiation energy stored on that portion embraces after-glows emanated by the stimulable phosphor sheet 3. The after-glows are divided into an instantaneous light emission after-glow and a stimulated light emission after-glow.

By "stimulated light emission after-glow" is meant the after-glow of light emitted by a stimulable phosphor sheet carrying a radiation image stored thereon when the sheet is exposed to stimulating rays (for example, a laser beam) for reading out the radiation image, the after-glow continuing to be emanated by the sheet while the light intensity decays after the exposure of the sheet to the stimulating rays is ceased. The characteristics of the stimulated light emission after-glow are generally as shown in FIG. 2, though they will differ depending on the type of the stimulable phosphor constituting the stimulable phosphor sheet. In the graph of FIG. 2, the ordinate represents the intensity of light emission and the abscissa represents the time (t). As shown in FIG. 2, when the exposure of a stimulable phosphor sheet to stimulating rays is ceased after the sheet is exposed to the stimulating rays for a period of Δt from a time t1 to a time t2, the intensity of light emitted by the sheet upon stimulation thereof at a light emission intensity A does not immediately decrease to zero, but instead a stimulated light emission after-glow continues while the intensity thereof decreases along an exponential function curve with the time constant thereof increasing gradually. (That is, the light intensity decreases rapidly at the beginning and thereafter the rate of decrease in the light intensity becomes gradually lower.)

For example, decay of the light emission intensity of the stimulated light emission after-glow is such that the initial time constant is approximately one microsecond, i.e. the time t3−t2 required for the light emission intensity to become 1/e (B/A=1/e) is approximately one microsecond. In general, since the speed of scanning (in the main scanning direction) of a stimulable phosphor sheet by stimulating rays by use of a galvanometer mirror is approximately 50 Hz, it takes approximately 20,000 microseconds for one scanning. Accordingly, the intensity of the stimulated light emission after-glow decaying along an exponential function curve with the initial time constant of one microsecond becomes very low as compared with the intensity of the light emitted by the stimulable phosphor sheet upon stimulation thereof when the sheet is exposed to the stimulating rays. Thus the intensity of the stimulated light emission after-glow at each point of the stimulable phosphor sheet becomes almost negligible.

However, the light emission by the stimulable phosphor sheet upon stimulation thereof when the sheet is exposed to stimulating rays arises from a portion having a very small area upon which the stimulating rays impinge, whereas the stimulated light emission after-glow is emanated by the whole surface of the stimulable phosphor sheet scanned by the stimulating rays. Therefore, as the stimulable phosphor sheet 3 is scanned point by point by the laser beam 1b as shown in FIG. 1, the light emitted by a portion of the sheet 3 upon which the laser beam 1b impinges at any given instant in proportion to the radiation energy stored on that portion and the stimulated light emission after-glow emanated by all of the portions covered by the front end face 4a of the light guide member 4 simultaneously enters the light guide member 4 from the front end face 4a and is guided to the photomultiplier 5. In this case, since the area of the portions covered by the front end face 4a of the light guide member 4 is markedly larger than the area of the portion of the stimulable phosphor sheet 3 which is momentarily exposed to the laser beam 1b and which emits light upon stimulation by the laser beam 1b, the amount of the stimulated light emission after-glow guided to the photomultiplier 5 becomes not negligible even though the intensity of the stimulated light emission after-glow becomes negligibly low as compared with the intensity of the light emitted by the sheet 3 upon stimulation thereof. The stimulated light emission after-glow detected together with the light emitted by the stimulable phosphor sheet upon stimulation thereof by stimulating rays as mentioned above constitutes a noise component in the electric image signals obtained by the read-out of a radiation image and makes it difficult to accurately read out the radiation image. The stimulated light emission after-glow give rise to a problem concerning noise particularly when the scanning speed of stimulating rays on the stimulable phosphor sheet carrying the radiation image stored thereon in the course of image read-out is increased.

SUMMARY OF THE INVENTION

The primary object of the present invention is to provide a radiation image recording and reproducing method which eliminates adverse effects of a stimulated light emission after-glow in the course of radiation image read-out from a stimulable phosphor sheet carrying the radiation image stored thereon.

Another object of the present invention is to provide a radiation image recording and reproducing method wherein a radiation image stored on a stimulable phosphor sheet is read out accurately.

The inventors carried out various experiments on adverse effects of the stimulated light emission after-glow on a radiation image in the course of reading out the radiation image stored on a stimulable phosphor sheet by scanning the sheet with stimulating rays and causing the sheet to emit light in proportion to the stored radiation energy. As a result, it was found that, when the level of a stimulated light emission after-glow signal obtained by photoelectrically detecting the stimulated light emission after-glow at a position on the stimulable phosphor sheet 20 mm beyond the position where exposure to stimulating rays is completed is not higher than $10^{-2.5}$ times the level of a stimulated light emission signal obtained by photoelectrically detecting light emitted by the sheet upon stimulation thereof, and the level of the stimulated light emission after-glow signal at a position 430 mm beyond the position where exposure to stimulating rays is completed is not higher than $10^{-3.3}$ times the level of the stimulated light emission signal, a visible radiation image can be reproduced substantially accurately based on these signals unless there are other noise signals.

Accordingly, the present invention provides a radiation image recording and reproducing method for storing a radiation image on a stimulable phosphor sheet, scanning the stimulable phosphor sheet with stimulating rays which cause it to emit light in proportion to the stored radiation energy, photoelectrically detecting the emitted light to obtain an image signal, and reproducing a visible radiation image by use of the image signal, wherein the improvement comprises the step of detecting said image signal including a stimulated light emission signal obtained by photoelectrically detecting said light emitted by a portion of said stimulable phosphor sheet exposed to said stimulating rays, and a stimulated light emission after-glow signal obtained by photoelectrically detecting a stimulated light emission after-glow emanated by the portion of said stimulable phosphor sheet which is no longer exposed to said stimulating rays after being exposed to said stimulating rays, said detection of said image signal being carried out in such a condition that the level of said stimulated light emission after-glow signal detected at a position on said stimulable phosphor sheet 20 mm beyond the position where exposure to said stimulating rays is completed is not higher than $10^{-2.5}$ times the level of said stimulated light emission signal, and the level of said stimulated light emission after-glow signal detected at a position 430 mm beyond the position where exposure to said stimulating rays is completed is not higher than $10^{-3.3}$ times the level of said stimulated light emission signal.

With the radiation image recording and reproducing method in accordance with the present invention, a radiation image stored on the stimulable phosphor sheet is read out by scanning with stimulating rays in such a condition that the level of the stimulated light emission after-glow signal obtained by photoelectrically detecting a stimulated light emission after-glow, which is emanated by the portion of the stimulable phosphor sheet no longer being exposed to stimulating rays, at a position on the stimulable phosphor sheet 20 mm beyond the position where exposure to stimulating rays is completed is not higher than $10^{-2.5}$ times the level of the stimulated light emission signal which is obtained by photoelectrically detecting light emitted by the portion of the stimulable phosphor sheet exposed to stimulating rays, and the level of the stimulated light emission after-glow signal detected at a position 430 mm beyond the position where exposure to stimulating rays is completed is not higher than $10^{-3.3}$ times the level of the stimulated light emission signal. Therefore, it is possible to eliminate adverse effects of the stimulated light emission after-glow on the image quality, and to accurately reproduce a visible radiation image.

DESCRIPTION OF THE PREFERRED EMBODIMENTS

The present invention will hereinbelow be described in further detail with reference to the accompanying drawings.

Figure 1:
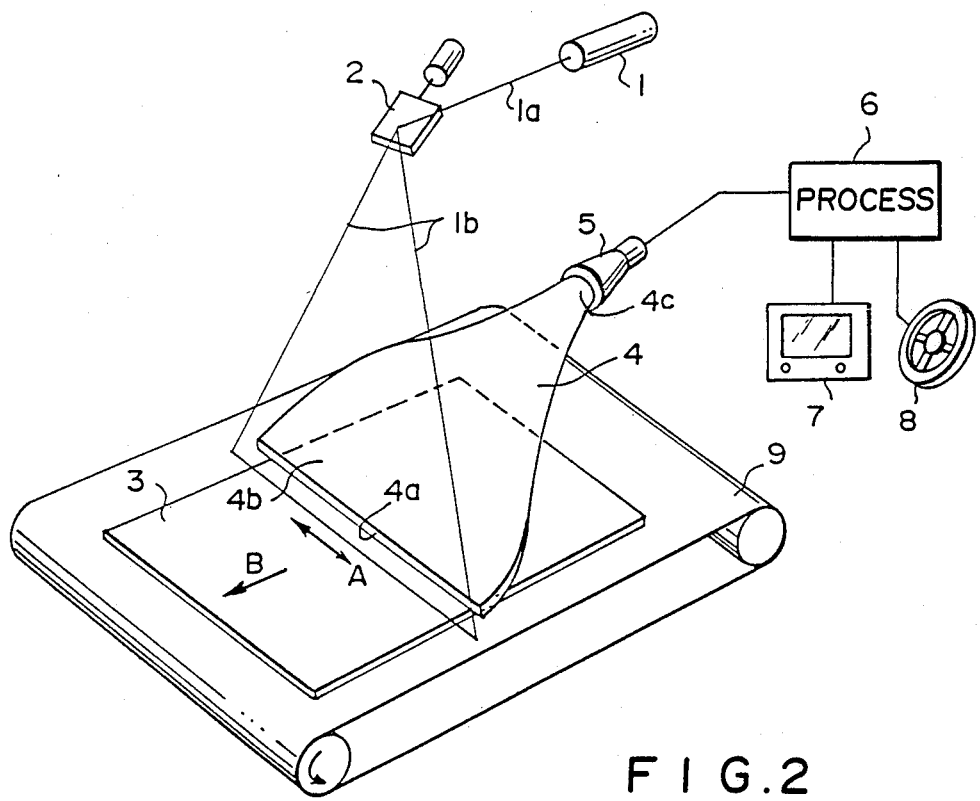
FIG. 1 is a perspective view showing a conventionally used radiation image read-out apparatus.
Figure 2:
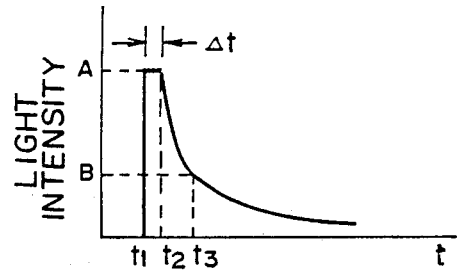
FIG. 2 is a graph showing the relationship between the intensity of light emitted by a stimulable phosphor sheet carrying a radiation image stored thereon when the sheet is exposed to stimulating rays, and time.
Figure 3A:
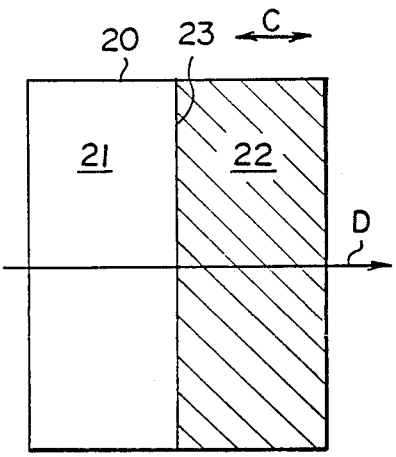
FIG. 3A is a plan view showing a sheet used for measuring a stimulated light emission after-glow signal.
Figure 3B:
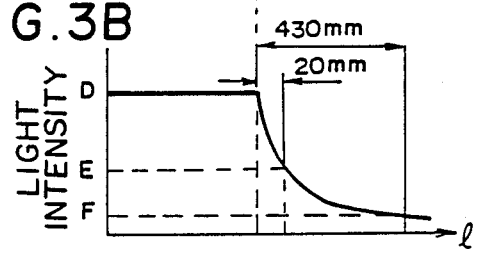
FIG. 3B is a graph showing the relationship between the intensity of light emitted by the sheet of FIG. 3A, uniformly exposed to a radiation and positions on the sheet, and the relationship between the intensity of the stimulated light emission after-glow emanated by the sheet and positions on the sheet.
Figure 4:
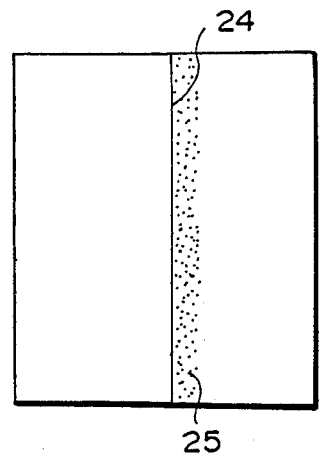
FIG. 4 is a plan view showing a reproduced image obtained by scanning the sheet of FIG. 3A uniformly exposed to a radiation with stimulating rays.

First, the ratio of the level of a stimulated light emission after-glow signal to the level of a stimulated light emission signal, and the effect of the ratio on an image will be described hereinbelow. In order to measure the level of the stimulated light emission after-glow signal, instead of the stimulable phosphor sheet 3 used in the apparatus of FIG. 1, a sheet 20 comprising a left half 21 provided with a layer of a stimulable phosphor and a right half 22 constituted only by a supporting material and provided with no stimulable phosphor as shown in FIG. 3A is prepared. The overall surface of the sheet 20 is uniformly exposed to a radiation, and image read-out is carried out on the sheet 20 by scanning it with stimulating rays at a speed of 20 m/sec. in the manner as shown in FIG. 1. When the sheet 20 is scanned with stimulating rays in the direction as indicated by the arrow D as shown in FIG. 3A, a stimulated light emission after-glow emanated by the left half 21 of the sheet 20 is also guided by the light guide member and detected when the right half 22 provided with no stimulable phosphor is being scanned with stimulating rays. Therefore, as shown in FIG. 3B, the intensity of light emitted by the sheet 20 and guided by the light guide member becomes as if the light were emitted also by the right half 22 of the sheet 20. As a result, as shown in FIG. 4, a shadow-like portion 25 where the density decreases gradually arises in the read-out image on the right side of a line 24 corresponding to a boundary 23 between the left half 21 and the right half 22 of the sheet 20.

In order to evaluate the shadow-like portion 25 quantitatively, the image density detected at the position on the sheet 20 mm beyond the boundary 23 after stimulating rays pass over the boundary 23, and the image density detected at the position 430 mm beyond the boundary 23 are measured by calculating the positions from the scanning speed. The measured image densities are compared with the density of the image corresponding to the left half 21 of the sheet 20. Specifically, in FIG. 3B, characteristics of the stimulated light emission after-glow are determined quantitatively by comparing the image density obtained by a stimulated light emission signal (SD) detected by photoelectrically converting a light emission intensity D when the left half 21 of the sheet 20 is scanned with stimulating rays, with the image densities obtained by a stimulated light emission after-glow signal (SE) and a stimulated light emission after-glow signal (SF) respectively detected by photoelectrically converting a light emission intensity E and a light emission intensity F at positions 20 mm and 430 mm beyond the boundary 23. In this case, the characteristics of the stimulated light emission after-glow are determined by detection at two points, i.e. the positions 20 mm and 430 mm beyond the position at which exposure to stimulating rays is completed. This is because the intensity of the stimulated light emission after-glow changes exponentially, and an approximately straight line is formed when the after-glow intensity and positions on the sheet are plotted on a semi-logarithmic graph. Thus the positions 20 mm and 430 mm beyond the boundary 23 are employed merely as two representative points, and other positions may be employed for determining the characteristics of the stimulated light emission after-glow. The position 20 mm beyond the boundary 23 represents the after-glow intensity at the portion where the decay rate of the after-glow intensity after exposure to stimulating rays is high, and the position 430 mm beyond the boundary 23 represents the after-glow intensity at the portion where the decay rate of the after-glow intensity becomes low. Determination of the change characteristics of the after-glow intensity is facilitated by employing the two points.

The characteristics of the stimulated light emission after-glow as mentioned above are measured also for various stimulable phosphor sheets exhibiting different after-glow characteristics. Then, recording of a radiation image of an object is carried out by use of a stimulable phosphor sheet formed of the same material as each of the stimulable phosphor sheets measured in this manner, the radiation image is read out from the stimulable phosphor sheet by scanning it with stimulating rays at a scanning speed of 20 m/sec. by use of the read-out apparatus as shown in FIG. 1, and a visible radiation image is reproduced by use of the image signal obtained by the image read-out. The image quality of the reproduced visible image is judged visually, and the effect of the stimulated light emission after-glow on the reproduced visible image is investigated.

When experiments were carried out in this manner, the results as shown in Table 1 and Table 2 were obtained.

TABLE 1

| Stimulated light emission after-glow signal (SE) / stimulated light emission signal (SD) | (20 mm) Image quality |
|---|---|
| Higher than $10^{-2.0}$ | x |
| $10^{-2.0}$ | x |
| $10^{-2.5}$ | Δ |
| $10^{-3.0}$ | o |
| Lower than $10^{-3.0}$ | o |

TABLE 2

| Stimulated light emission after-glow signal (SF) / stimulated light emission signal (SD) | (430 mm) Image quality |
|---|---|
| Higher than $10^{-2.8}$ | x |
| $10^{-3.0}$ | x |
| $10^{-3.3}$ | Δ |
| $10^{-3.8}$ | o |
| Lower than $10^{-3.8}$ | o |

In Table 1 and Table 2, the mark "x" in the image quality column indicates that the extent of adverse effects of the stimulated light emission after-glow on the image quality of the reproduced visible image is large (visually perceptible) and not acceptable in practice. The mark "Δ" indicates that the extent of adverse effects of the stimulated light emission after-glow is nearly acceptable in practice though the adverse effects are slightly perceptible. The mark "o" indicates that almost no adverse effects of the stimulated light emission after-glow are perceived visually and no problem arises in practice. Table 1 shows the relationship between the image quality and the ratio of the level of the stimulated light emission after-glow signal (SE) at the position 20 mm beyond the position, at which exposure to stimulating rays is completed, to the level of the stimulated light emission signal (SD). From Table 1, the image quality is judged to be practically acceptable when the level of the stimulated light emission after-glow signal (SE) is not higher than $10^{-2.5}$ times the level of the stimulated light emission signal (SD). On the other hand, Table 2 shows the relationship between the image quality and the ratio of the level of the stimulated light emission after-glow signal (SF) at the position 430 mm beyond the position at which exposure to stimulating rays is completed, to the level of the stimulated light emission signal (SD). From Table 2, the image quality is judged to be practically acceptable when the level of the stimulated light emission after-glow signal (SF) is not higher than $10^{-3.3}$ times the level of the stimulated light emission signal (SD).

As mentioned above, it was found that a visible radiation image can be reproduced without being adversely affected by the stimulated light emission after-glow regardless of the scanning speed of stimulating rays when the level of the stimulated light emission after-glow signal at a position 20 mm beyond the position where exposure to stimulating rays is completed is not higher than $10^{-2.5}$ times the level of the stimulated light emission signal, and the level of the stimulated light emission after-glow signal at a position 430 mm beyond the position where exposure to stimulating rays is completed is not higher than $10^{-3.3}$ times the level of the stimulated light emission signal. The level of the stimulated light emission after-glow signal at a position 20 mm beyond the position where exposure to stimulating rays is completed should preferably be not higher than $10^{-3.0}$ times the level of the stimulated light emission signal, and the level of the stimulated light emission after-glow signal at a position 430 mm beyond the position where exposure to stimulating rays is completed should preferably be not higher than $10^{-3.8}$ times the level of the stimulated light emission signal.

In order to adjust the level of the stimulated light emission after-glow signal to the aforesaid range, a stimulable phosphor sheet composed of a stimulable phosphor exhibiting such good decay characteristics of the after-glow intensity that the level of the stimulated light emission after-glow signal becomes within the aforesaid range may be used. Or, for example, the shape of the light guide member may be modified or a device for cutting off only the stimulated light emission after-glow may be provided so that, though the intensity of the stimulated light emission after-glow is high, the level of the stimulated light emission after-glow signal after photoelectric detection by the photomultiplier via the light guide member becomes within the aforesaid range.

We claim:

1. A radiation image recording and reproducing method for storing a radiation image on a stimulable phosphor sheet, scanning the stimulable phosphor sheet with stimulating rays which cause it to emit light in proportion to the stored radiation energy, photoelectrically detecting the emitted light to obtain an image signal, and reproducing a visible radiation image by use of the image signal, wherein the improvement comprises the step of detecting said image signal including a stimulated light emission signal obtained by photoelectrically detecting said light emitted by a portion of said stimulable phosphor sheet exposed to said stimulating rays, and a stimulated light emission after-glow signal obtained by photoelectrically detecting a stimulated light emission after-glow emanated by the portion of said stimulable phosphor sheet which is no longer exposed to said stimulating rays after being exposed to said stimulating rays, said detection of said image signal being carried out with the criteria such that the level of said stimulated light emission after-glow signal detected at a position on said stimulable phosphor sheet 20 mm beyond the position where exposure to said stimulating rays is completed is not higher than $10^{-2.5}$ times the level of said stimulated light emission signal, and the level of said stimulated light emission after-glow signal detected at a position 430 mm beyond the position where exposure to said stimulating rays is completed is not higher than $10^{-3.3}$ times the level of said stimulated light emission signal.

2. A method as defined in claim 1 wherein said detection of said image signal is carried out with the criteria such that the level of said stimulated light emission after-glow signal detected at a position on said stimulable phosphor sheet 20 mm beyond the position where exposure to said stimulating rays is completed is not higher than $10^{-3.0}$ times the level of said stimulated light emission signal, and the level of said stimulated light emission after-glow signal detected at a position 430 mm beyond the position where exposure to said stimulating rays is completed is not higher than $10^{-3.8}$ times the level of said stimulated light emission signal.

3. A method as defined in claim 1 wherein the level of said stimulated light emission after-glow signal is adjusted by selection of the stimulable phosphor constituting said stimulable phosphor sheet.

4. A method as defined in claim 1 wherein the level of said stimulated light emission after-glow signal is adjusted by selection of the means for photoelectrically detecting the light emitted by said stimulable phosphor sheet.

5. A method as defined in claim 1 wherein the level of said stimulated light emission after-glow signal is adjusted by the provision of a device for cutting off only the stimulated light emission after-glow.

* * * * *